United States Patent Office.

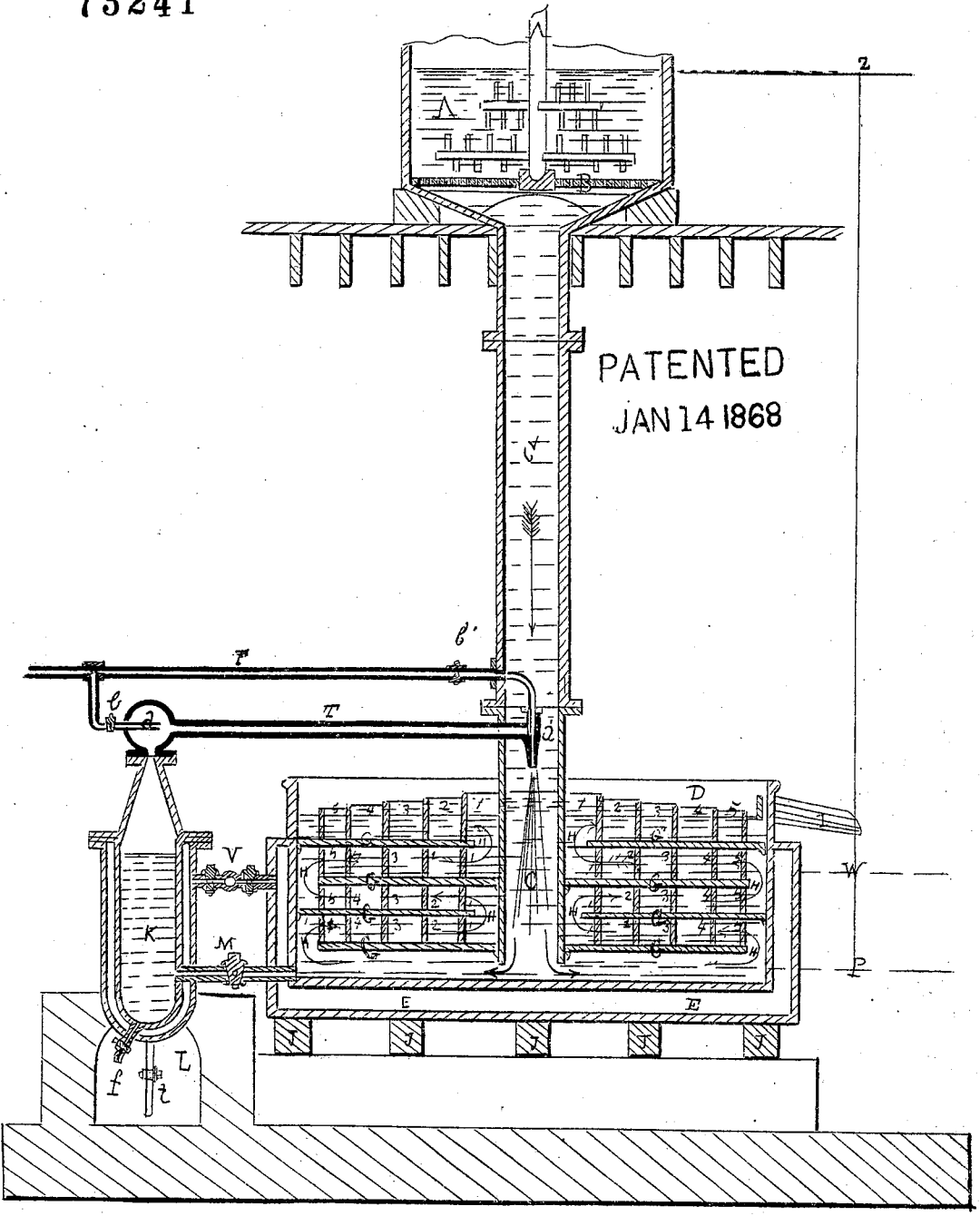

A. L. FLEURY, OF NEW YORK, N. Y.

Letters Patent No. 73,241, dated January 14, 1868.

---

IMPROVED AMALGAMATOR.

---

The Schedule referred to in these Letters Patent and making part of the same.

---

TO ALL WHOM IT MAY CONCERN:

Be it known that I, A. L. FLEURY, of the city of New York, in the county and State of New York, have invented certain Improvements in Amalgamators; and I do hereby declare that the following is a full and exact description thereof, which will enable others skilled in the art to make and use the same, reference being had to the annexed drawings, in which is represented a sectional elevation of my improved amalgamator.

The nature of my invention consists in the construction and use of a new and improved amalgamator for treating gold ores and for saving gold in the tailings, in the manner more fully described below.

A is a churn or pug-mill, provided with suitable agitators A', and having a perforated false bottom, B. The churn A is placed on the upper floor of a building, or is elevated on framework, so as to allow below a space of some fifteen feet for the balance of the apparatus. C is a cast-iron pipe, extending from the bottom of the churn A, and terminated at its lower part by the copper pipe C', which reaches almost to the bottoms of the open vat D. This vat D is made of iron, and has a steam-jacket, E, which allows of the temperature of the pan D to be kept at the desired degree for working. G G' G'' G''' are plates of metal, placed in the pan D at different heights, as represented in my drawings, leaving alternately an annular space, H, at the circumference and at the centre of the apparatus. 1, 2, 3, 4, and 5, are sets of rings, of perforated copper, properly amalgamated, which are placed in the pan D, upon each of the plates G, one in the other, forming concentric walls, partitions, or diaphragms, in the space left between the plates G G', &c. I is the discharge-spout of the pan D. The whole apparatus rests on blocks J J J, &c., or any other foundation. K is a retort, having a steam-jacket and mounted upon a furnace, L, where heat may be applied when it is necessary. M is a pipe, provided with a stop-cock, and establishing a communication between the pan D and the retort K. V is the steam-pipe, having proper valves and connections to introduce steam into the jackets of the retort K or of the pan D. From the upper part of the retort K there is a pipe, T, arranged so as to convey the vapors of mercury from the retort K to a pointed spout, S, having its opening looking downward in the pipe C'. F is a steam-pipe, having properly made and arranged jet-pipes and stop-cocks, b b', to work in the place a a' as an injector, so that in the pipe T and from the spout S a strong current or jet of vapors of mercury and of steam will take place. t is a drain-pipe, for the steam-jacket of the retort K, and f is the discharge-cock of that retort.

In putting up my apparatus care must be taken that the pan D is placed low enough so that there will be from ten to twelve times as much distance from Z to W as there is from W to P; the line Z indicating the level of the water in the churn A, the line W the level of the mercury in the pan D, and the line P being the lower end of the pipe C'. The blue indicates water and ore-mud, and the green, mercury.

Operation.

The ore or tailings in powder-form is placed in the churn A with water to make it into a thin mud. Heat is applied to the pan D by the steam-pipe V, to keep the mercury as liquid, fluid, and energetic as possible, and the retort K, in which is placed any of the mercury containing gold in solution, is heated, so as to distill the mercury slowly and regularly. Steam is now allowed to flow by the cocks b and b', which will start the injectors, causing a strong current in the pipe T, and a powerful jet to issue from the spout S. This jet imparts a downward motion to the contents of the pipe C and C', and the ore-mud and water are driven in the pan D through the mercury, and through the perforated rings 1, 2, 3, 4, and 5, in the direction of the arrows, from one division to the other, in an upward direction, until it leaves the mercury at the line W, and continues to be forced through the amalgamated copper sieves or perforated copper plates 1', 2', 3', 4', 5', which have for object to retain all the minute particles of mercury contained and carried off mechanically by the flow of the mud and water, and which otherwise would be lost. As the vat D is open at top, all the plates b b' b'' b''', and the copper rings 1, 2, 3, 4, 5, can be taken away from time to time for cleaning, and for obtaining the gold which will adhere to the amalgamated perforated copper plates or rings.

Claim.

The herein-described amalgamator, constructed and operating substantially in the manner set forth.

A. L. FLEURY.

Witnesses:
 E. TRIPP,
 A. K. P. JOY.